(12) United States Patent
Trnka

(10) Patent No.: US 9,272,382 B2
(45) Date of Patent: Mar. 1, 2016

(54) AUTOMATED SANDING SYSTEM

(71) Applicant: The Boeing Company, Chicago, IL (US)

(72) Inventor: Thomas Edward Trnka, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 58 days.

(21) Appl. No.: 14/048,591

(22) Filed: Oct. 8, 2013

(65) Prior Publication Data

US 2015/0099425 A1 Apr. 9, 2015

(51) Int. Cl.
*B24B 1/00* (2006.01)
*B24B 19/14* (2006.01)
*B24B 19/26* (2006.01)
*B24B 49/12* (2006.01)
*B24B 27/00* (2006.01)
*B25J 9/16* (2006.01)
*B25J 11/00* (2006.01)
*B25J 5/02* (2006.01)
*B25J 9/00* (2006.01)

(52) U.S. Cl.
CPC . *B24B 1/00* (2013.01); *B24B 19/14* (2013.01); *B24B 19/26* (2013.01); *B24B 27/0038* (2013.01); *B24B 49/12* (2013.01); *B25J 5/02* (2013.01); *B25J 9/0084* (2013.01); *B25J 9/1684* (2013.01); *B25J 11/0065* (2013.01); *Y10T 29/49769* (2015.01); *Y10T 29/5176* (2015.01)

(58) Field of Classification Search
CPC ...... B24B 19/14; B24B 49/12; B24B 37/013; B24B 49/04
USPC .................. 451/6, 5, 8, 9, 10, 57, 65, 66, 44
See application file for complete search history.

(56) References Cited

U.S. PATENT DOCUMENTS

| | | | |
|---|---|---|---|
| 4,461,124 A | | 7/1984 | Anderson |
| 5,554,068 A | * | 9/1996 | Carr et al. ..................... 451/468 |
| 5,643,047 A | * | 7/1997 | Beckett et al. ................... 451/6 |
| 7,512,457 B2 | * | 3/2009 | Wood et al. .................. 700/175 |
| 8,227,722 B2 | * | 7/2012 | Crowther .................... 219/60 A |

(Continued)

FOREIGN PATENT DOCUMENTS

DE 19956343 A1 5/2011

OTHER PUBLICATIONS

"Radiusing," Surface Preparation—Texas, LLC, copyright 2014, 2 pages, accessed Jan. 15, 2014. http://www.surfacepreparation.com/applications/radiusing.

(Continued)

*Primary Examiner* — Monica Carter
*Assistant Examiner* — Lauren Beronja
(74) *Attorney, Agent, or Firm* — Yee & Associates, P.C.

(57) ABSTRACT

A method and apparatus for sanding a number of surface features on a surface of an object. A first type of operation may be performed on the number of surface features on the surface of the object using a first end effector. Feedback laser data may be generated about the number of surface features after the first type of operation has been performed using a laser device. A second type of operation may be performed on the number of surface features using a second end effector and the feedback laser data to rework the number of surface features until the number of surface features has been reworked to within selected tolerances.

20 Claims, 13 Drawing Sheets

(56) References Cited

U.S. PATENT DOCUMENTS

2002/0072297 A1* 6/2002 Kennerknecht et al. .......... 451/5
2008/0216336 A1* 9/2008 Wood et al. .................... 33/551
2008/0280541 A1* 11/2008 Chou et al. .................... 451/59
2013/0237135 A1 9/2013 Von Schumann

OTHER PUBLICATIONS

Extended European Search Report, dated Feb. 12, 2015, regarding Application No. EP14179919.7, 6 pages.

* cited by examiner

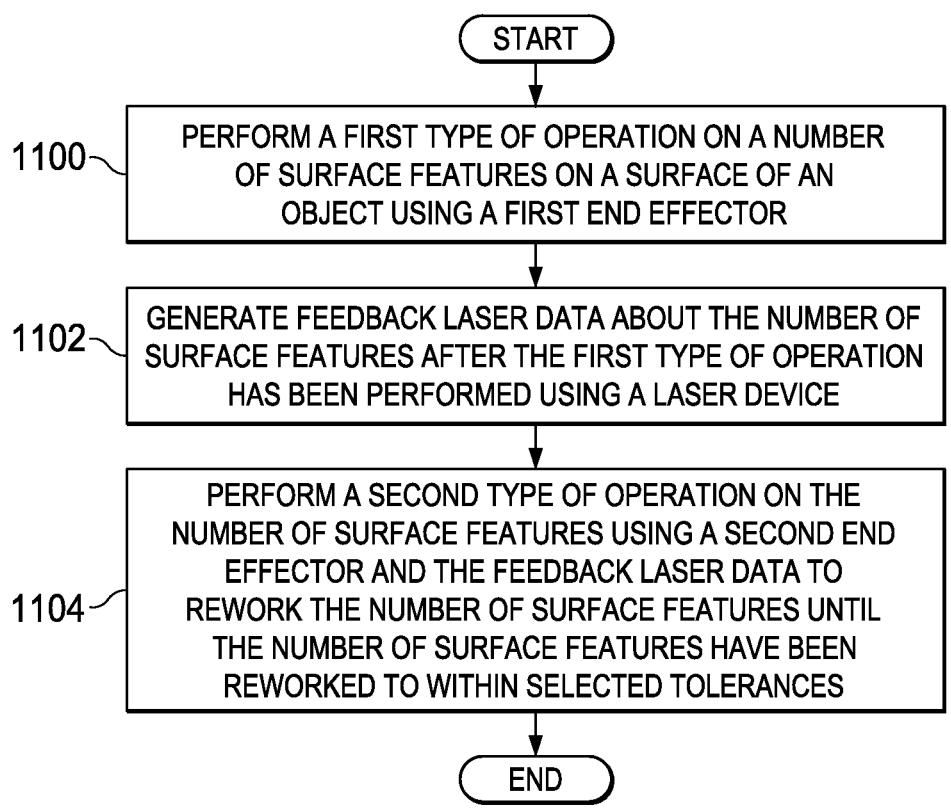

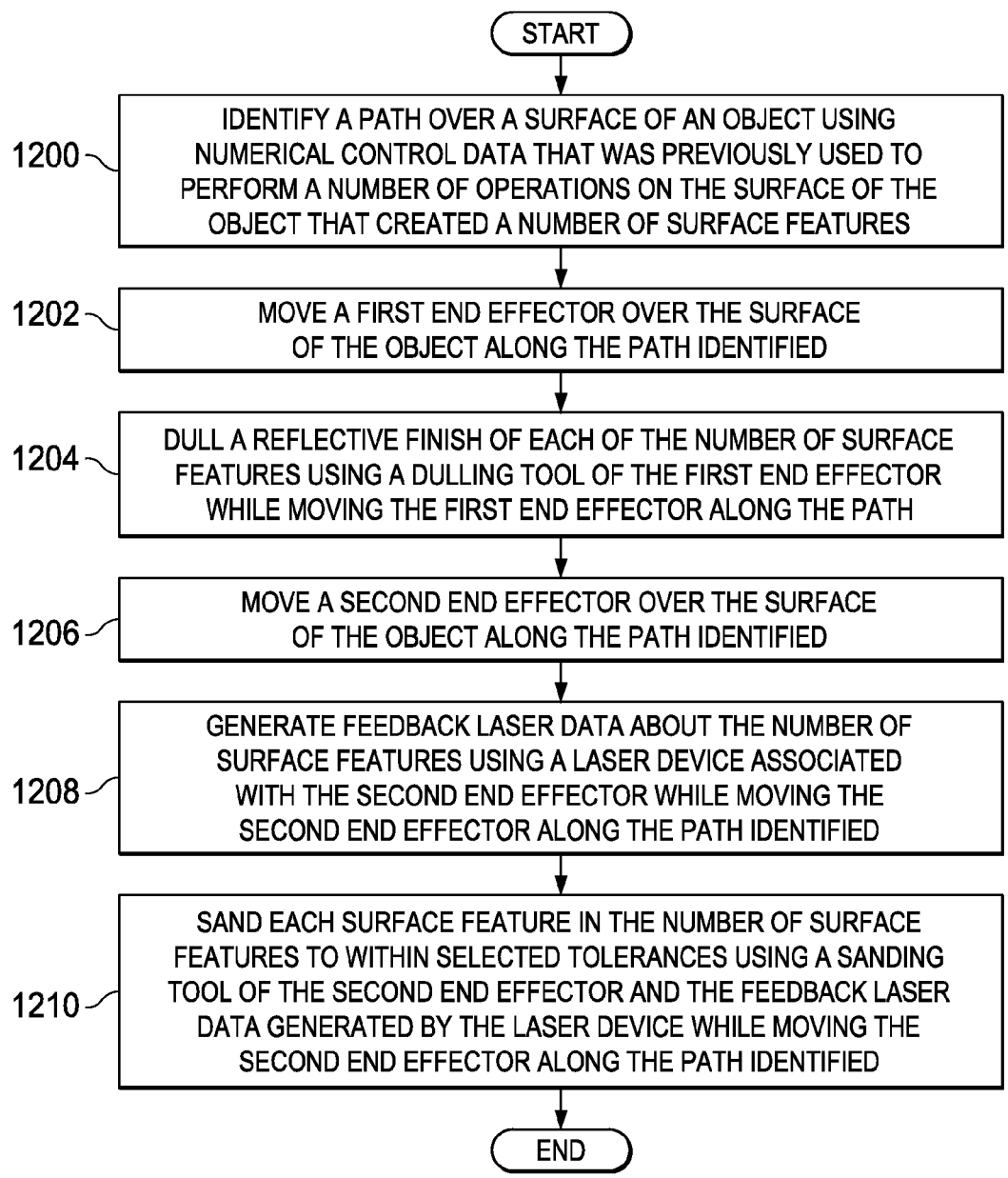

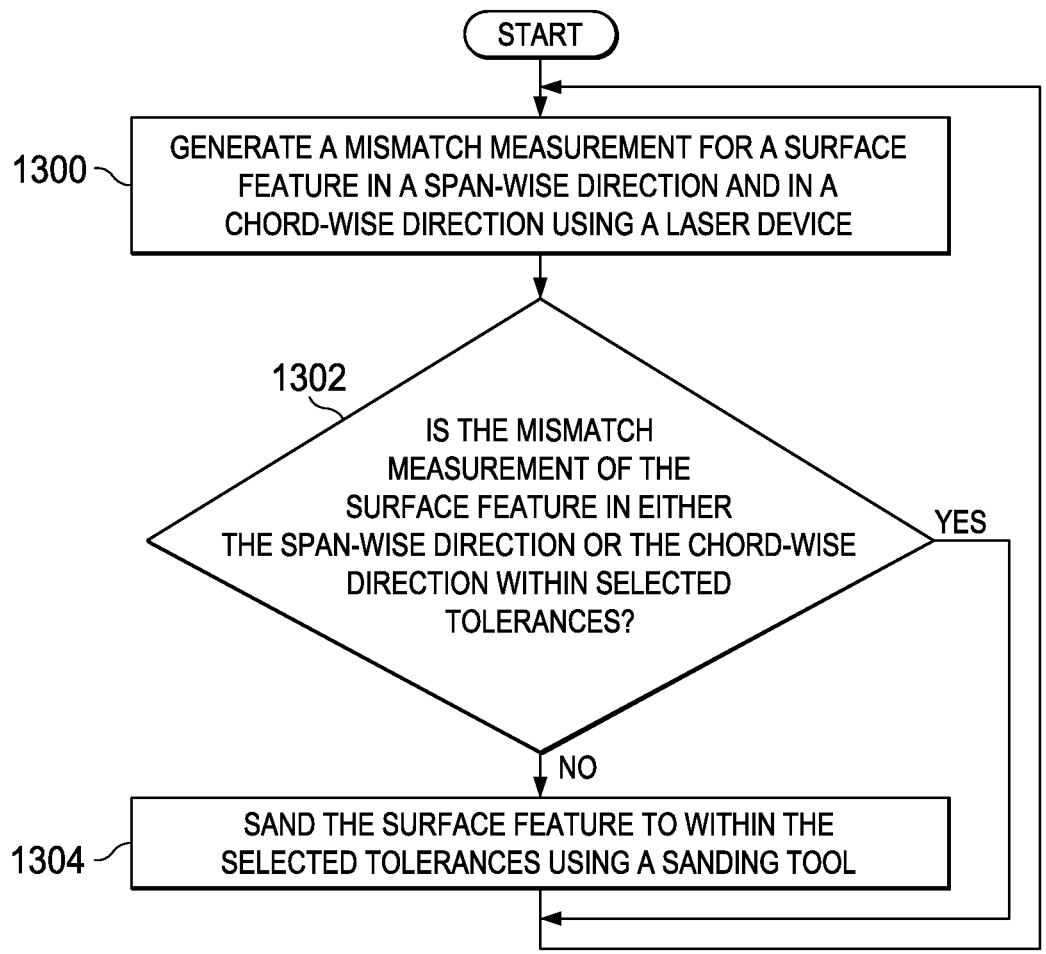

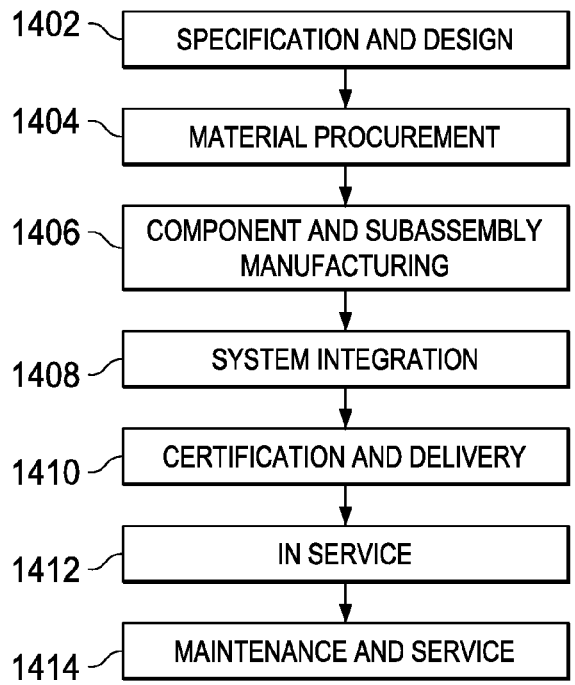
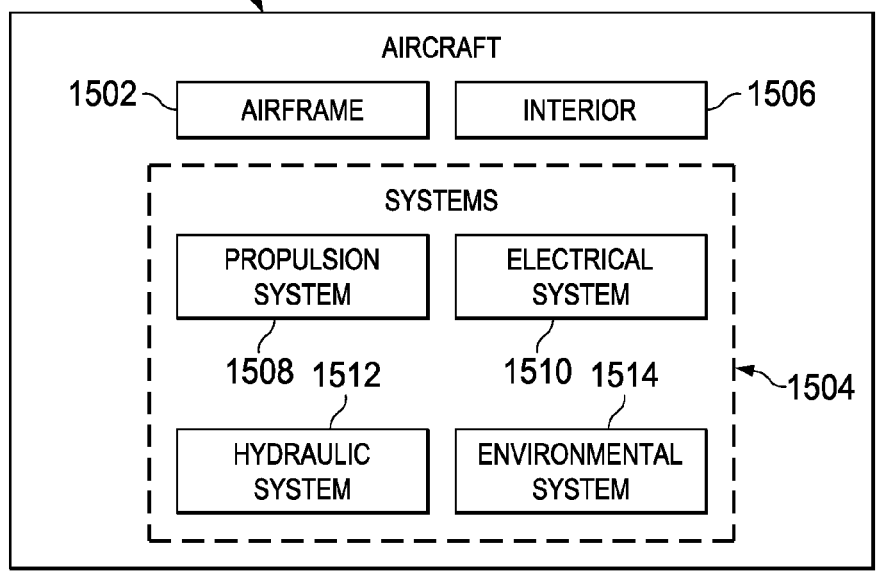

AUTOMATED SANDING SYSTEM

BACKGROUND INFORMATION

1. Field

The present disclosure relates generally to sanding operations and, in particular, to an automated sanding system for performing these sanding operations. Still more particularly, the present disclosure relates to an automated sanding system for sanding surface mismatches on the surfaces of objects.

2. Background

In the manufacturing of certain objects, undesired surface inconsistencies may sometimes be created on the surfaces of these objects. As one illustrative example, milling operations performed during the manufacturing of a wing for an aircraft may result in out-of-tolerance surface inconsistencies. A milling operation is a machining operation that removes material from a workpiece. This operation may be performed by, for example, without limitation, cutting material away from the workpiece, cutting slots into the workpiece, threading, routing, planning, drilling, and/or performing other types of cutting operations.

Milling operations may be performed using a milling machine. A milling machine may include one or more cutting tools. A cutting tool may be used to remove material from an object while the cutting tool is moved relative to the object. In some cases, a surface feature is created on the surface of the object after this operation is performed. This surface inconsistency may be referred to as a "mismatch," a "surface mismatch," or a "cutter mismatch." The mismatch may take the form of, for example, without limitation, a raised edge, a sharp edge, or some other type of surface mismatch. The mismatch may be the result of, for example, a step-over in the direction of travel. As another example, the mismatch may be the result of the cutting tool replacing another cutter tool.

When a mismatch is outside of selected tolerances, the mismatch needs to be reworked to within the selected tolerances. For example, the mismatch may need to be sanded down to within selected tolerances. This sanding operation may also be referred to as "blending" the mismatch with the rest of the surface of the object. The blending of a mismatch with a surface is typically performed using a manually-operated sanding device. However, using a manually-operated sanding device to blend multiple mismatches may be more time-consuming and labor-intensive than desired. Additionally, the quality of the blending of multiple mismatches may be less consistent than desired when performed manually.

Further, depending on the shape, size, and type of object on which these mismatches are located, manually blending these mismatches with the surface of the object may be ergonomically difficult for a human operator. For example, using a manually-operated sanding device may cause ergonomic issues with respect to the hands, wrists, arms, shoulders, and/or back of the human operator operating the sanding device. Therefore, it would be desirable to have a method and apparatus that take into account at least some of the issues discussed above, as well as other possible issues.

SUMMARY

In one illustrative embodiment, a method may be provided. A first type of operation may be performed on a number of surface features on a surface of an object using a first end effector. Feedback laser data may be generated about the number of surface features after the first type of operation has been performed using a laser device. A second type of operation may be performed on the number of surface features using a second end effector and the feedback laser data to rework the number of surface features until the number of surface features has been reworked to within selected tolerances.

In yet another illustrative embodiment, an apparatus may comprise a first end effector, a laser device, and a second end effector. The first end effector may be configured to perform a first type of operation on a number of surface features on a surface of an object. The laser device may be configured to generate feedback laser data about the number of surface features after the first type of operation has been performed. The second end effector may be configured to perform a second type of operation on the number of surface features using the feedback laser data to rework the number of surface features until the number of surface features has been reworked to within selected tolerances.

In still another illustrative embodiment, an automated sanding system may comprise a controller, a first end effector, a first robotic device, a second end effector, and a second robotic device. The controller may be configured to identify a path over a surface of an object using numerical control data that was previously used to perform a number of operations on the surface of the object that created a number of surface features. The first end effector may include a dulling tool configured for use in dulling a reflective finish of the number of surface features. The first robotic device may be configured to move the first end effector along the path identified. The first robotic device may be further configured to position the dulling tool over each of the number of surface features. The second end effector may comprise a laser device and a sanding tool. The laser device may be configured to generate feedback laser data about the number of surface features after the reflective finish of the number of surface features has been dulled. The sanding tool may be configured for use in sanding the number of surface features based on the feedback laser data until the number of surface features has been sanded to within selected tolerances. The second robotic device may be configured to move the second end effector along the path identified. The second robotic device may be further configured to position the sanding tool and the laser device over the each of the number of surface features.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a process for sanding a number of surface features in the form of a flowchart in accordance with an illustrative embodiment;

FIG. 12 is an illustration of a process for sanding a number of surface mismatches on a surface of wing skin in the form of a flowchart in accordance with an illustrative embodiment;

FIG. 13 is an illustration of a process for performing a sanding operation on a surface mismatch in the form of a flowchart in accordance with an illustrative embodiment;

FIG. 14 is an illustration of an aircraft manufacturing and service method in the form of a block diagram in accordance with an illustrative embodiment; and FIG. 15 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a method and apparatus for automating the processing of blending surface mismatches. Further, the illustrative embodiments recognize and take into account that it may be desirable to have an automated sanding system capable of working on different types of surfaces, including surfaces that have reflective finishes.

The illustrative embodiments recognize and take into account that some currently available milling machines may be automated. For example, a computer numerical control (CNC) milling machine is a type of automated milling machine. A computer numerical control milling machine may be controlled by a computer using numerical control programming code. The illustrative embodiments recognize and take into account that it may be desirable to use the numerical control programming code used to guide a milling machine along a particular path to program an automated sanding system to follow substantially the same path.

Thus, the illustrative embodiments provide a method and apparatus for automating the sanding of surface mismatches on objects, such as wing skins. Using the automated sanding system described by the illustrative embodiments below may reduce the overall time and labor resources needed for these types of sanding operations.

Figure 1:
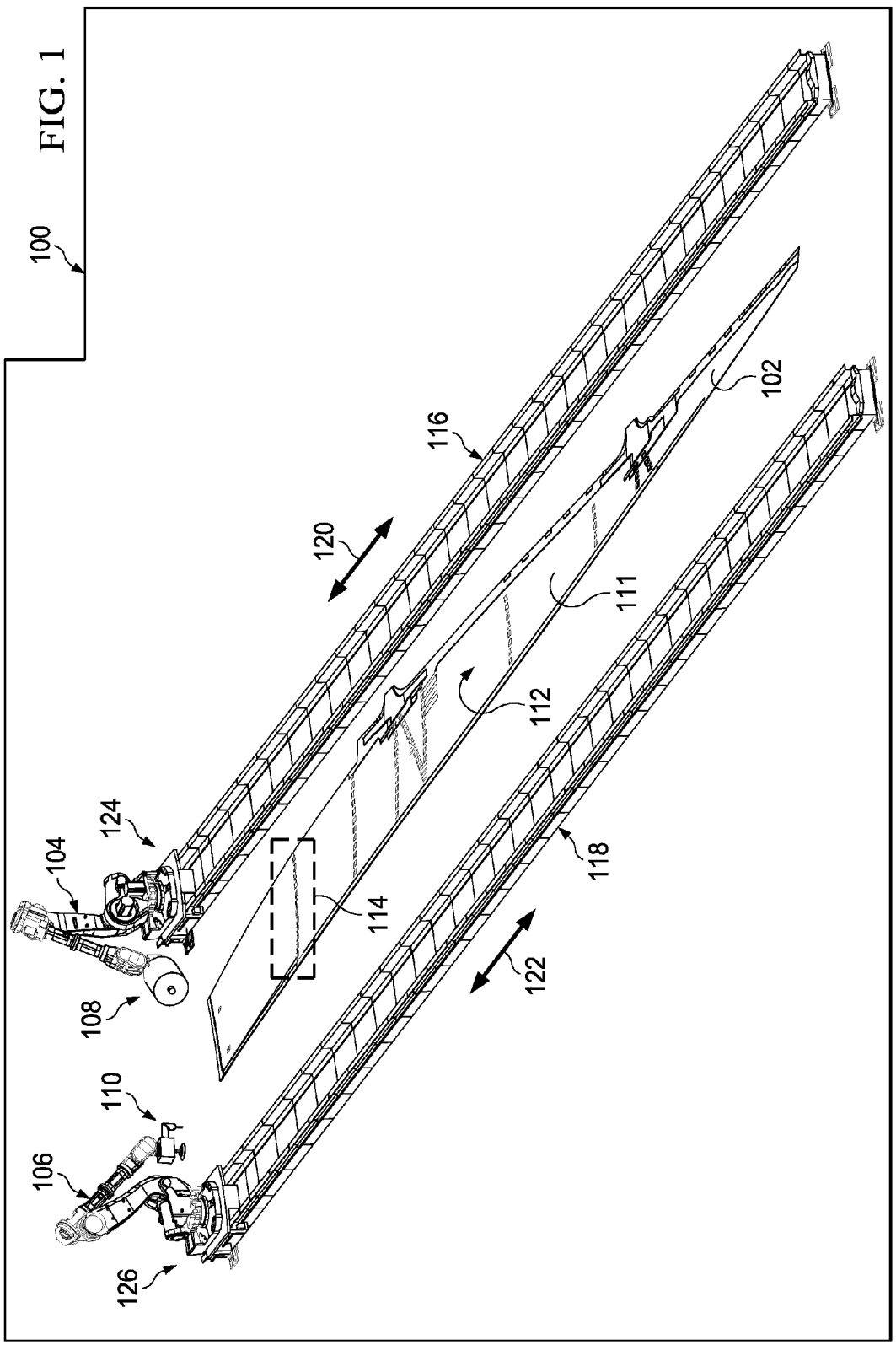
FIG. 1 is an illustration of an isometric view of a sanding environment in accordance with an illustrative embodiment.

Referring now to the figures and, in particular, with reference to FIG. 1, an illustration of an isometric view of a sanding environment is depicted in accordance with an illustrative embodiment. As depicted, sanding environment 100 includes wing skin 102, first robotic device 104, and second robotic device 106.

In this illustrative example, first end effector 108 is associated with first robotic device 104 and second end effector 110 is associated with second robotic device 106. As used herein, when one component is "associated" with another component, the association is a physical association in the depicted examples.

For example, a first component, such as first end effector 108, may be considered to be associated with a second component, such as first robotic device 104, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

As depicted, wing skin 102 may have surface 111. In this illustrative example, surface 111 may have a reflective finish. In other words, surface 111 may be a reflective surface. A milling machine (not shown in this view) is used to perform cutting operations over surface 111 of wing skin 102. The milling machine is a computer numerical control (CNC) milling machine in this illustrative example. Performing the cutting operations using this milling machine creates surface mismatches 112 on surface 111. Surface mismatches 112 may take the form of, for example, raised or sharp edges on surface 111 of wing skin 102.

In this illustrative example, surface mismatches 112 may be out-of-tolerance. In other words, each of surface mismatches 112 may have one or more dimensions outside of selected tolerances. For example, each of surface mismatches 112 may be raised or extend past surface 111 beyond some selected threshold. Surface mismatches 112 may need to be reworked to within selected tolerances. In particular, surface mismatches 112 may need to be sanded down and smoothed. More particularly, surface mismatches 112 may need to be blended with surface 111 to within selected tolerances.

First end effector 108 may be used to dull the reflective finish on and around each of surface mismatches 112. Dulling this reflective finish may allow a laser device (not shown in this view) associated with second end effector 110 to better measure surface mismatches 112. Second end effector 110 may be used to sand each of surface mismatches 112 to within selected tolerances based on feedback laser data from this laser device.

As depicted, surface mismatches 112 may be present on different portions of surface 111. For example, a portion of surface mismatches 112 may be present on portion 114 of surface 111 of wing skin 102.

In this illustrative example, first robotic device 104 may be attached to rail system 116, while second robotic device 106 may be attached to rail system 118. Wing skin 102 has been positioned between these rail systems. First robotic device 104 may move in either direction along axis 120 on rail system 116 to move first end effector 108 relative to wing skin 102. Similarly, second end effector 110 may move in either direction along axis 122 on rail system 118 to move second end effector 110 relative to wing skin 102.

As depicted, first robotic device 104 and second robotic device 106 are in initial position 124 and initial position 126, respectively. These initial positions may be the positions at which first robotic device 104 and second robotic device 106 begin when a wing, such as wing skin 102, is moved into a selected position between rail system 116 and rail system 118. The process by which first robotic device 104 with first end effector 108 and second robotic device 106 with second end effector 110 are used to sand surface mismatches 112 on surface 111 of wing skin 102 to within selected tolerances is described in the figures below.

Figure 2:
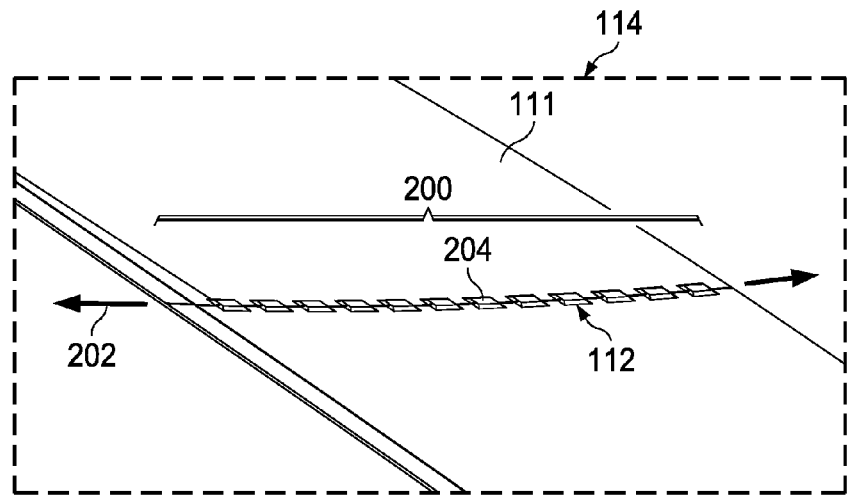
FIG. 2 is an illustration of an enlarged view of a portion of a surface in accordance with an illustrative embodiment.

With reference now to FIG. 2, an illustration of an enlarged view of portion 114 of surface 111 from FIG. 1 is depicted in accordance with an illustrative embodiment. As depicted, set of surface mismatches 200 are present on portion 114 of surface 111. Set of surface mismatches 200 may be a portion of surface mismatches 112 depicted in FIG. 1.

In this illustrative example, set of surface mismatches 200 may be aligned along path 202. Path 202 may be the path used by the milling machine to perform cutting operations on portion 114 of surface 111. Surface mismatch 204 is an example of one of set of surface mismatches 200. As depicted, surface mismatch 204 comprises a portion of surface 111 being raised above the surrounding portion of surface 111. Surface mismatch 204 may be sanded such that the portion of surface 111 included in surface mismatch 204 may be blended with the portion of surface 111 surrounding surface mismatch 204.

Figure 3:
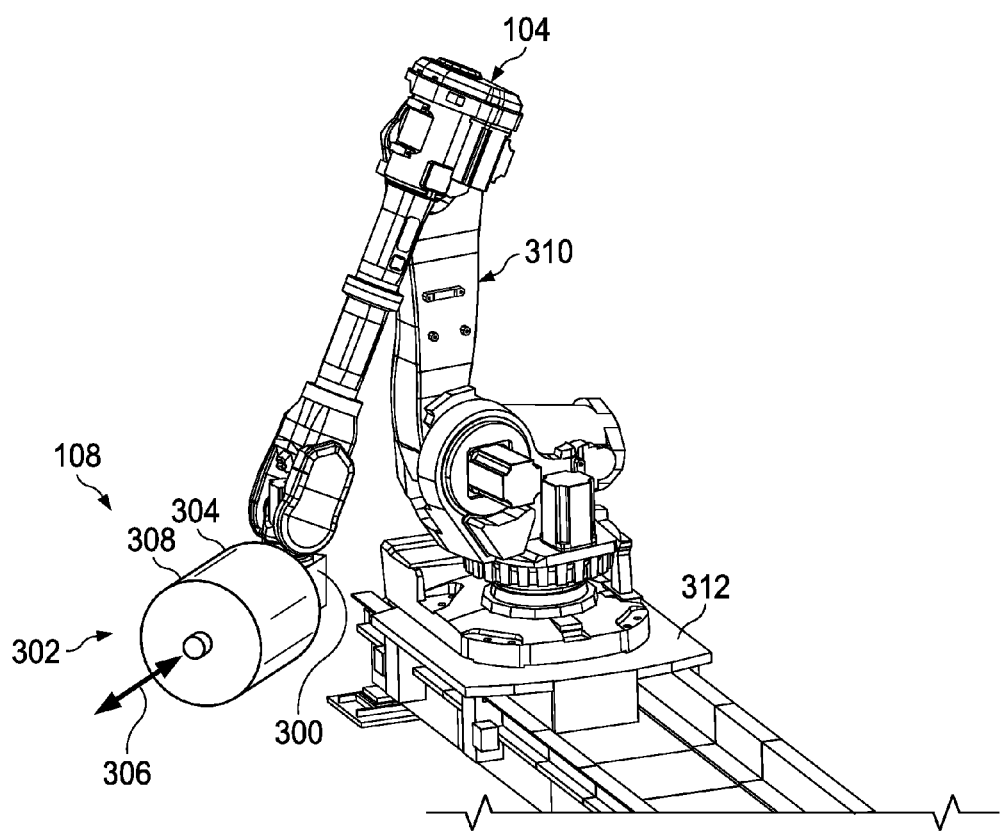
FIG. 3 is an illustration of an enlarged isometric view of a first robotic device and a first end effector in accordance with an illustrative embodiment.

With reference now to FIG. 3, an illustration of an enlarged isometric view of first robotic device 104 and first end effector 108 from FIG. 1 is depicted in accordance with an illustrative embodiment. As depicted, first end effector 108 includes attachment structure 300 and dulling tool 302. Attachment structure 300 is used to attach first end effector 108 to first robotic device 104.

Dulling tool 302 takes the form of rotating flap brush 304 in this illustrative example. In particular, rotating flap brush 304 may be rotated about axis 306. Rotating flap brush 304 has outer surface 308. Outer surface 308 may have a texture configured to remove a finish, such as the reflective finish on surface 111 of wing skin 102 in FIGS. 1-2. In this illustrative example, outer surface 308 may be an abrasive surface.

As depicted, first robotic device 104 takes the form of robotic arm 310 connected to base 312. Robotic arm 310 may be configured to move first end effector 108, and thereby rotating flap brush 304, in a number of different directions. Base 312 is configured for attachment to rail system 116 from FIG. 1.

Figure 4:
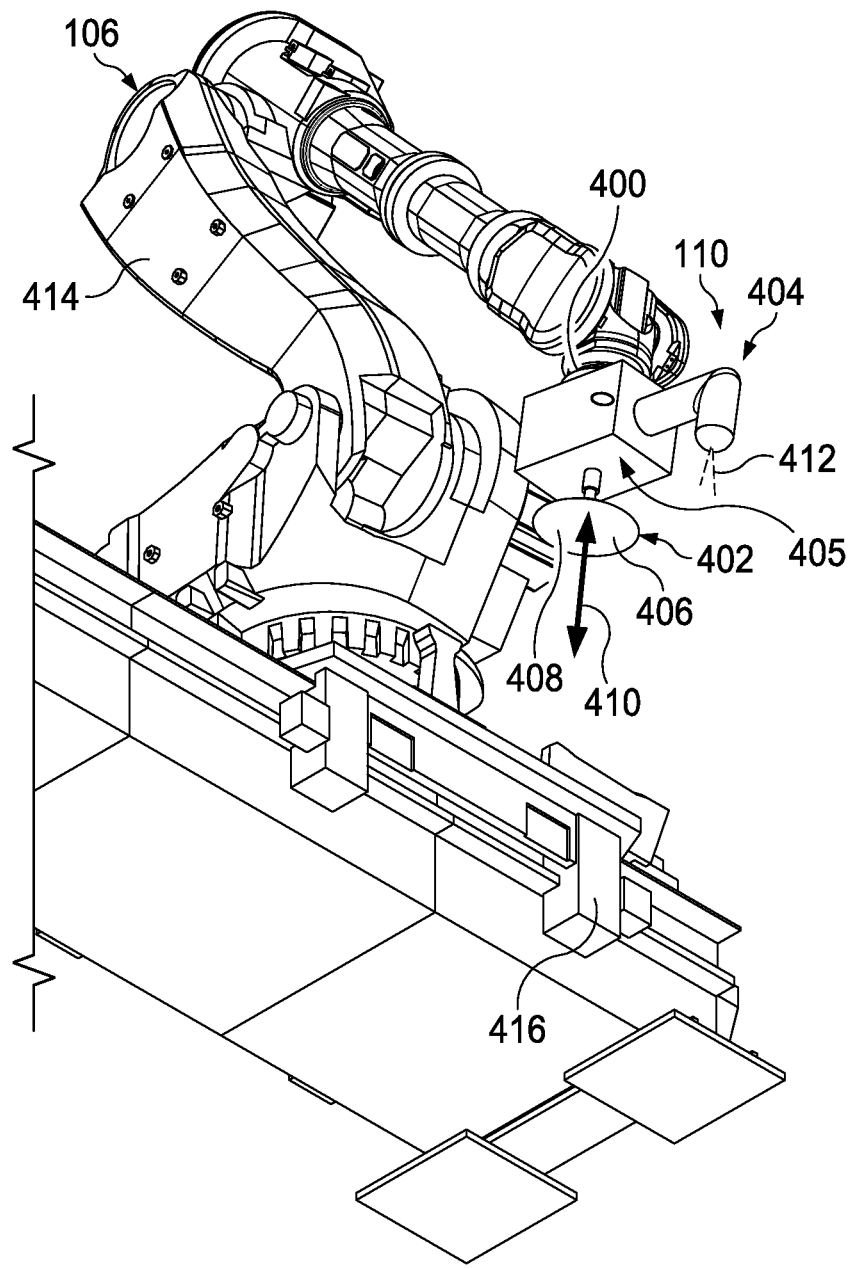
FIG. 4 is an illustration of an enlarged isometric view of a second robotic device in accordance with an illustrative embodiment.

With reference now to FIG. 4, an illustration of an enlarged isometric view of second robotic device 106 from FIG. 1 is depicted in accordance with an illustrative embodiment. As depicted, second end effector 110 includes attachment structure 400, sanding tool 402, laser device 404, and control box 405. Attachment structure 400 is used to attach second end effector 110 to second robotic device 106.

Sanding tool 402 takes the form of sanding pad 406 in this illustrative example. Sanding pad 406 may have sanding surface 408 that may be used for sanding when sanding pad 406 is rotated about axis 410. Control box 405 may include a control unit (not shown) that is used to control the operation of sanding pad 406. The control unit may be, for example, a processor unit that controls a number of parameters that may include, but are not limited to, the rotational speed of sanding pad 406 about axis 410, the number of turns completed for each surface mismatch being sanded, the pressure applied to a surface by sanding pad 406, and other types of parameters.

The pressure applied to a surface by sanding pad 406 may be controlled by controlling the movement of sanding pad 406 in a direction along axis 410. For example, sanding pad 406 may be moved down towards a surface to apply pressure to the surface.

In this illustrative example, laser device 404 is attached to control box 405. In this manner, laser device 404 is associated with second end effector 110 by being part of second end effector 110. Laser device 404 may be used to generate laser beam 412 that is used to measure a surface mismatch. These laser measurements may be sent to the control unit and used by the control unit to generate one or more commands for second robotic device 106 and/or to adjust the operation of sanding pad 406.

As depicted, second robotic device 106 takes the form of robotic arm 414 connected to base 416. Robotic arm 414 may be configured to move second end effector 110, and thereby sanding pad 406, in a number of different directions. Base 416 is configured for attachment to rail system 118 from FIG. 1.

Figure 5:
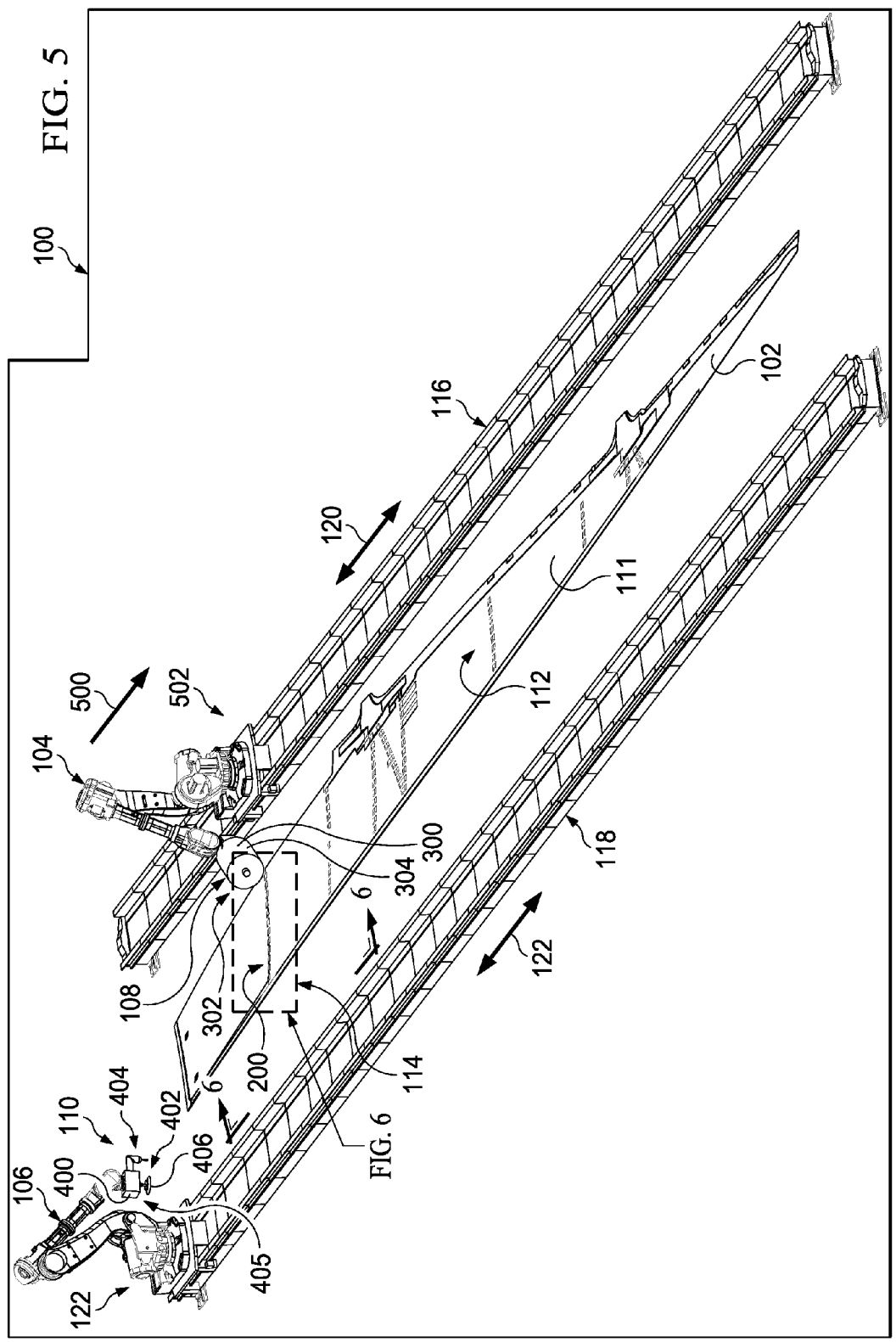
FIG. 5 is an illustration of a sanding environment in accordance with an illustrative embodiment.

With reference now to FIG. 5, an illustration of sanding environment 100 from FIG. 1 is depicted in accordance with an illustrative embodiment. In this illustrative example, first robotic device 104 has been moved in the direction of arrow 500 from initial position 124 in FIG. 1 to position 502. In position 502, first robotic device 104 may position rotating flap brush 304 over portion 114 of surface 111 such that the reflective finish on set of surface mismatches 200 may be dulled.

Figure 6:
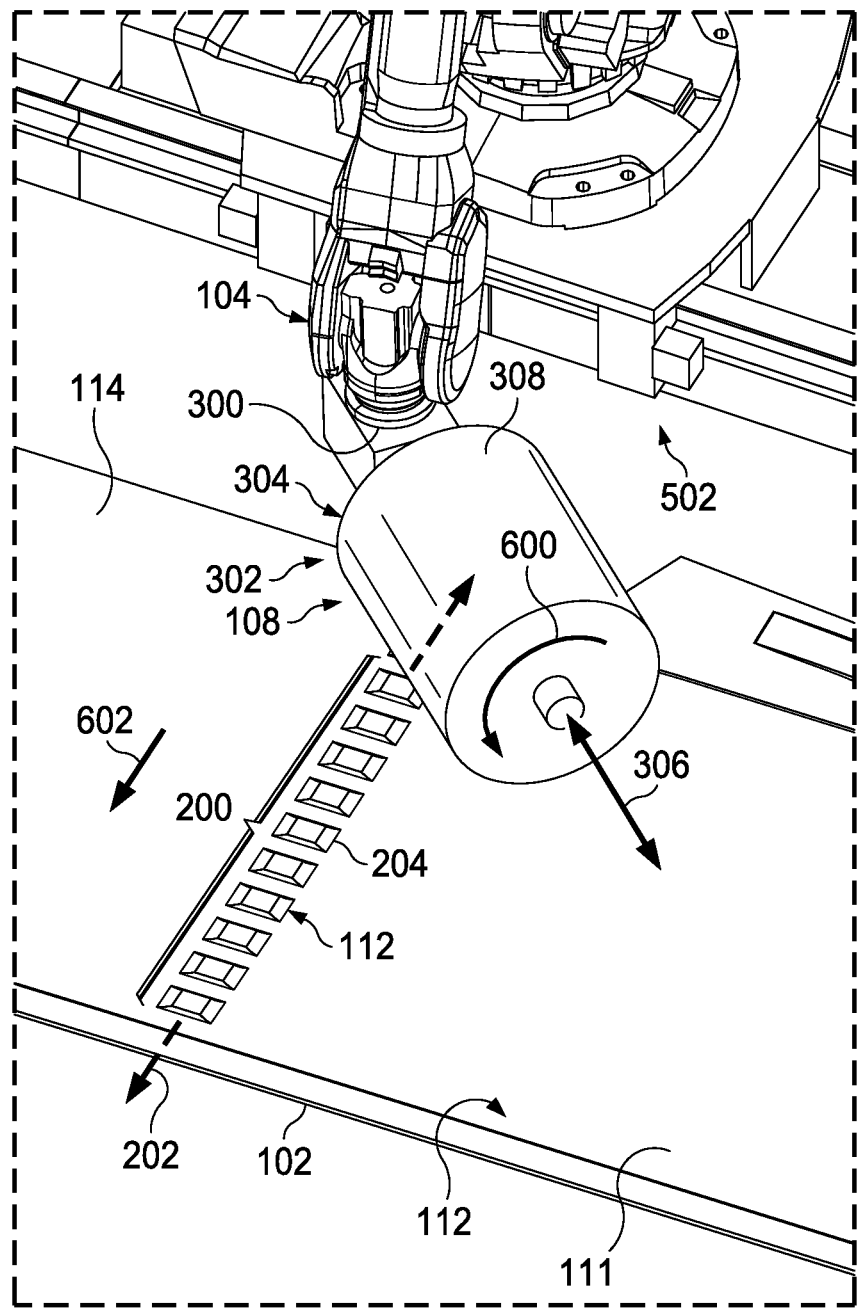
FIG. 6 is an illustration of an enlarged view of a rotating flap brush positioned over a portion of a surface in accordance with an illustrative embodiment.

Turning now to FIG. 6, an illustration of an enlarged view of rotating flap brush 304 positioned over portion 114 of surface 111 is depicted in accordance with an illustrative embodiment. In particular, the enlarged view of rotating flap brush 304 positioned over portion 114 of surface 111 is depicted taken with respect to lines 6-6 in FIG. 5.

First robotic device 104 is configured to guide rotating flap brush 304 along path 202 based on the numerical control programming code that was used to control the milling machine that performed cutting operations along path 202. In this illustrative example, first robotic device 104 is configured to rotate rotating flap brush 304 in the direction of arrow 600 about axis 306, while moving rotating flap brush 304 in the direction of arrow 602 substantially along path 202. As rotating flap brush 304 is moved in the direction of arrow 602, rotating flap brush 304 contacts surface 111 and consequently, dulls the reflective finish on portion 114 of surface 111.

In particular, the reflective finish on set of surface mismatches 200 and the portion of surface 111 surrounding set of surface mismatches 200 is dulled. By dulling this reflective finish, rotating flap brush 304 prepares this area for laser device 404 in FIG. 4. Laser device 404 may be unable to take measurements of surface 111 with a desired level of accuracy when surface 111 is reflective.

Figure 7:
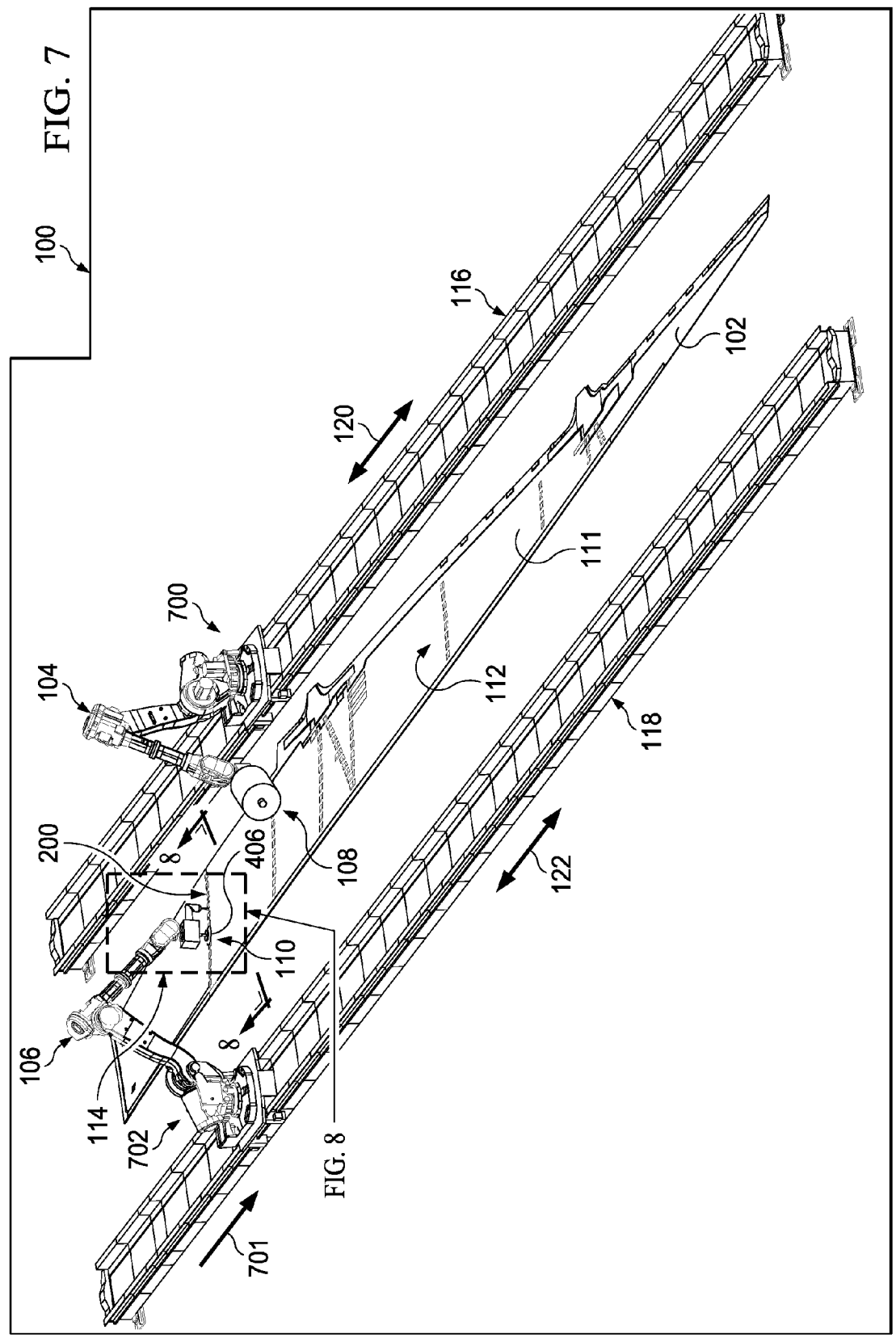
FIG. 7 is an illustration of a sanding environment with a first robotic device and a second robotic device moved to new positions in accordance with an illustrative embodiment.

With reference now to FIG. 7, an illustration of sanding environment 100 from FIG. 1 with first robotic device 104 and second robotic device 106 moved to new positions is depicted in accordance with an illustrative embodiment. In this illustrative example, first robotic device 104 has completed dulling operations on portion 114 of surface 111 and has moved to position 700. Further, second robotic device 106 has been moved in the direction of arrow 701 to position 702. In position 702, second robotic device 106 may position sanding pad 406 over portion 114 of surface 111 and set of surface mismatches 200 on portion 114 of surface 111.

Figure 8:
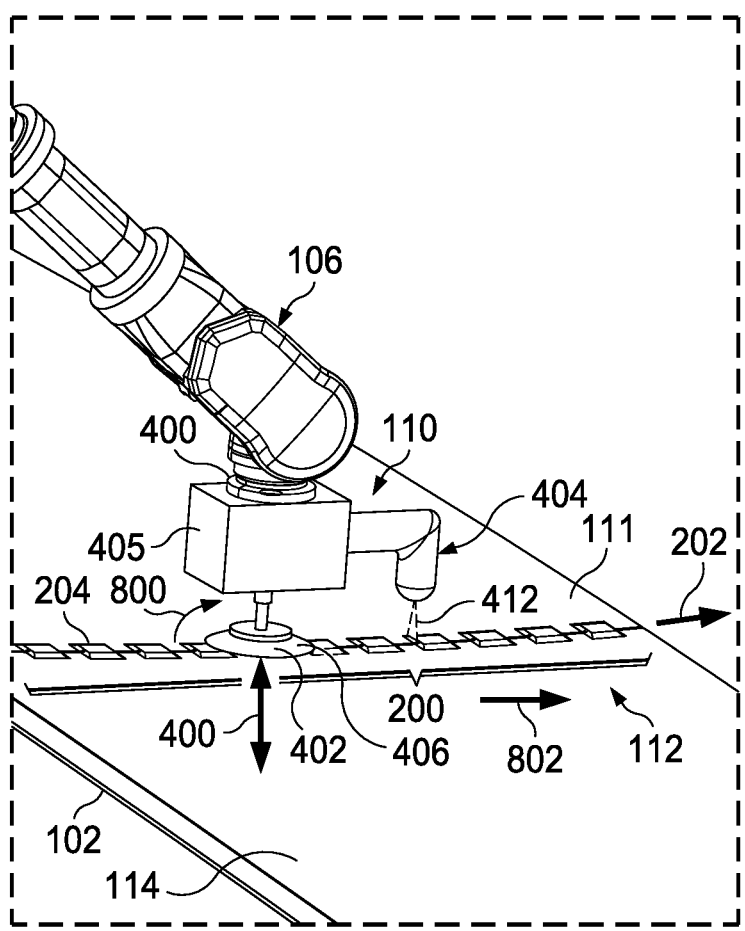
FIG. 8 is an illustration of an enlarged view of a sanding tool positioned over a portion of a surface in accordance with an illustrative embodiment.

Turning now to FIG. 8, an illustration of an enlarged view of sanding tool 402 positioned over portion 114 of surface 111 is depicted in accordance with an illustrative embodiment. In particular, the enlarged view of sanding tool 402 positioned over portion 114 of surface 111 is depicted taken with respect to lines 8-8 in FIG. 7.

Second robotic device 106 is configured to guide sanding pad 406 along path 202 based on the numerical control programming code that was used to control the milling machine that performed cutting operations along path 202. Second robotic device 106 rotates sanding pad 406 in the direction of arrow 800 about axis 410, while moving sanding pad 406 in the direction of arrow 802 substantially along path 202 to each of set of surface mismatches 200.

The control unit in control box 405 uses feedback laser data generated by laser device 404 to control the operation, movement, and positioning of sanding pad 406 over each of set of surface mismatches 200 such that each of set of surface mismatches 200 is sanded to within selected tolerances.

Figure 9:
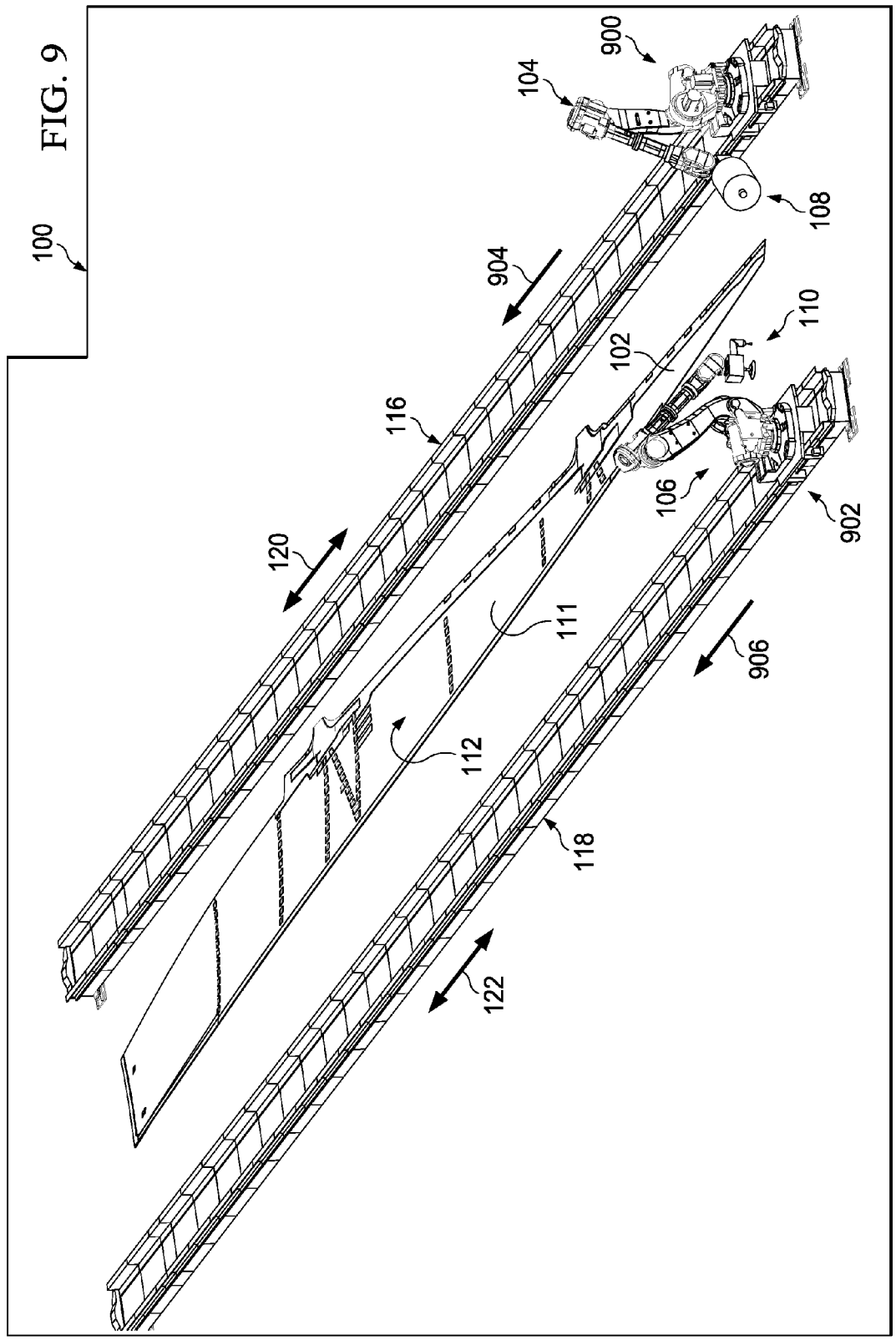
FIG. 9 is an illustration of a sanding environment with a first robotic device and a second robotic device moved to final positions in accordance with an illustrative embodiment.

With reference now to FIG. 9, an illustration of sanding environment 100 from FIG. 1 with first robotic device 104 and second robotic device 106 moved to final positions is depicted in accordance with an illustrative embodiment. In this illustrative example, all sanding operations have been completed and all of surface mismatches 112 have been sanded down and blended with the rest of surface 111 to within selected tolerances. First robotic device 104 and second robotic device 106 have moved to final position 900 and final position 902, respectively.

Once wing skin 102 has been moved out of sanding environment 100, first robotic device 104 and second robotic device 106 may be moved back to initial position 124 and initial position 126, respectively, from FIG. 1, to perform sanding operations on a different wing. In this manner, the process of sanding surface mismatches on wing surfaces may be automated.

The illustrations of sanding environment 100, wing skin 102, first robotic device 104, second robotic device 106, first end effector 108, and second end effector 110 in FIGS. 1-9 are not meant to imply physical or architectural limitations to the manner in which an illustrative embodiment may be implemented. Other components in addition to or in place of the ones illustrated may be used. Some components may be optional.

The different components shown in FIGS. 1-9 may be illustrative examples of how components shown in block form in FIG. 10 below can be implemented as physical structures. Additionally, some of the components in FIGS. 1-9 may be combined with components in FIG. 10, used with components in FIG. 10, or a combination of the two.

Figure 10:
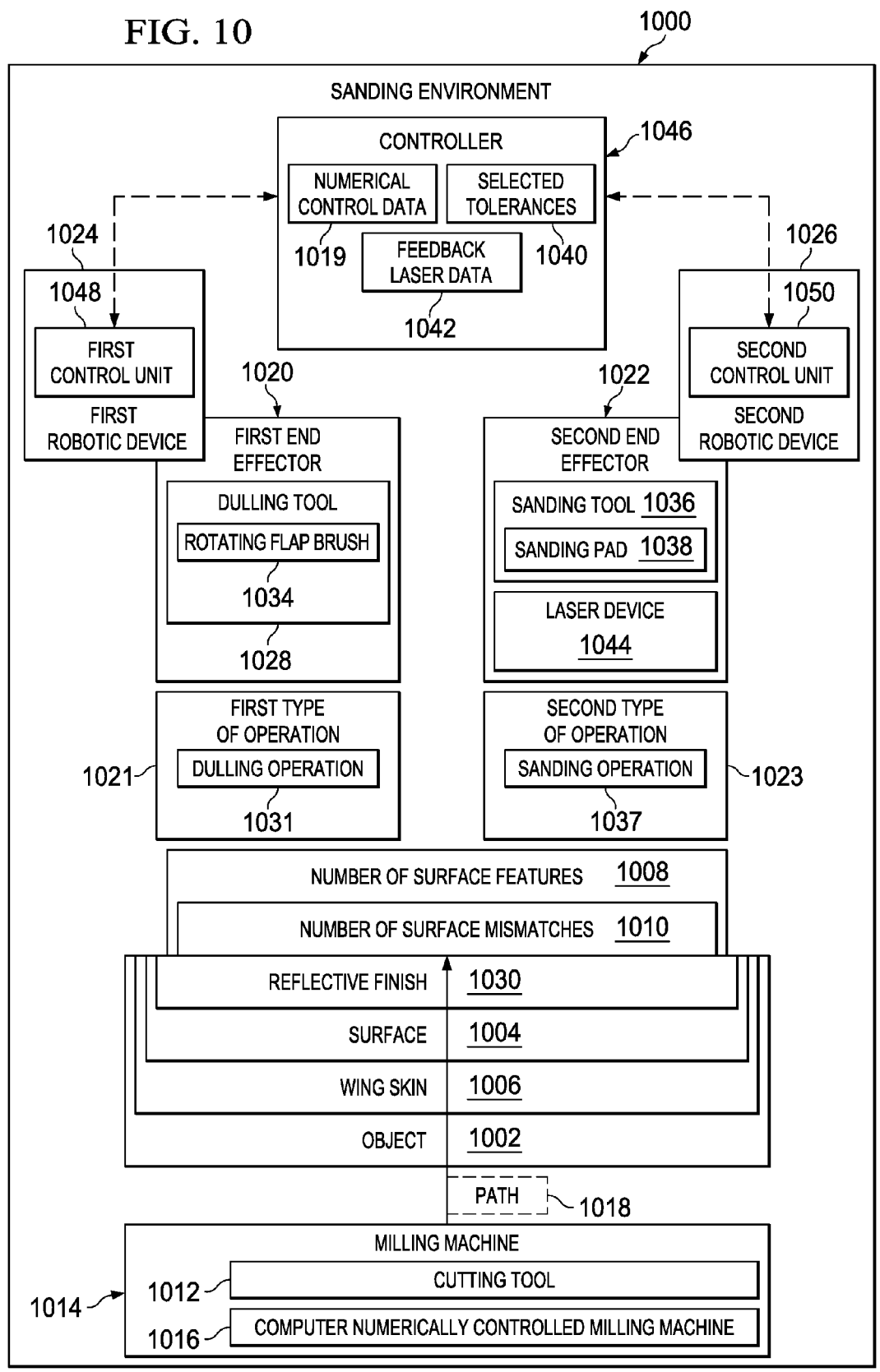
FIG. 10 is an illustration of a sanding environment in the form of a block diagram in accordance with an illustrative embodiment.

With reference now to FIG. 10, an illustration of a sanding environment is depicted in the form of a block diagram in accordance with an illustrative embodiment. Sanding environment 100 in FIG. 1 is an example of one manner in which sanding environment 1000 may be implemented. As depicted, sanding environment 1000 may be an environment in which sanding operations may be performed on surface 1004 of object 1002. In this illustrative example, object 1002 takes the form of wing skin 1006. However, in other illustrative examples, object 1002 may take the form of some other type of object such as, but not limited to, a fuselage skin, a metal door, a metal plate, a spar, or some other type of object.

Number of surface features 1008 may be present on surface 1004. As used herein, a "number of" items may include one or more items. In this manner, number of surface features 1008 may include one or more surface features.

Number of surface features 1008 may take the form of number of surface mismatches 1010 in this illustrative example. Number of surface mismatches 1010 may have been created by cutting tool 1012. In one illustrative example, cutting tool 1012 may be part of milling machine 1014. In particular, milling machine 1014 may take the form of computer numerically controlled milling machine 1016. Cutting tool 1012 may have been controlled by milling machine 1014 to perform cutting operations along path 1018 on surface 1004 based on numerical control data 1019. Numerical control data 1019 may comprise numerical control programming code.

First end effector 1020 and second end effector 1022 may be used to rework number of surface mismatches 1010 to within selected tolerances. In particular, first end effector 1020 may be used to perform first type of operation 1021 on number of surface mismatches 1010, while second end effector 1022 may be used to perform second type of operation 1023 on number of surface mismatches 1010.

As depicted, first end effector 1020 is associated with first robotic device 1024 and second end effector 1022 is associated with second robotic device 1026 in this illustrative example. First robotic device 1024 and second robotic device 1026 may take the form of, for example, robotic arms.

First end effector 1020 may include dulling tool 1028. Dulling tool 1028 is configured to perform dulling operation 1031, which includes dulling reflective finish 1030 on the portion of surface 1004 along path 1018. Dulling operation 1031 may be an example of first type of operation 1021. In this manner, reflective finish 1030 on number of surface mismatches 1010 and the portion of surface 1004 surrounding number of surface mismatches 1010 along path 1018 may be dulled. In one illustrative example, dulling tool 1028 takes the form of rotating flap brush 1034.

First robotic device 1024 may control the movement of first end effector 1020. For example, first robotic device 1024 may be used to move and position dulling tool 1028 of first end effector 1020 relative to surface 1004. First robotic device 1024 may identify path 1018 along which number of surface mismatches 1010 was formed based on numerical control data 1019. First robotic device 1024 may move dulling tool 1028 along path 1018 such that reflective finish 1030 of the portion of surface 1004 along path 1018 may be dulled by dulling tool 1028.

Second end effector 1022 may include sanding tool 1036. Sanding tool 1036 is configured to perform sanding operation 1037, which includes sanding number of surface mismatches 1010. Sanding operation 1037 is an example of second type of operation 1023. In one illustrative example, sanding tool 1036 takes the form of sanding pad 1038.

Second robotic device 1026 may control the movement of second end effector 1022. For example, second robotic device 1026 may be used to move and position sanding tool 1036 of second end effector 1022 relative to surface 1004. Second robotic device 1026 may identify path 1018 along which number of surface mismatches 1010 was formed based on numerical control data 1019. Second robotic device 1026 may move sanding tool 1036 to each of number of surface mismatches 1010 such that each of number of surface mismatches 1010 may be sanded down to within selected tolerances 1040.

In this illustrative example, sanding tool 1036 performs sanding operation 1037 based on feedback laser data 1042 received from laser device 1044. Laser device 1044 may be associated with second end effector 1022. In this illustrative example, laser device 1044 is considered part of second end effector 1022. However, in other illustrative examples, laser device 1044 may be considered separate from second end effector 1022.

Laser device 1044 is configured to generate feedback laser data 1042 by measuring each of number of surface mismatches 1010 as second end effector 1022 is moved along path 1018. In this illustrative example, controller 1046 may receive feedback laser data 1042 and control operation of sanding tool 1036 based on feedback laser data 1042. For example, controller 1046 may use feedback laser data 1042 to adjust a number of parameters for sanding tool 1036. These parameters may include, for example, without limitation, rotational speed, number of turns, pressure applied to a surface, and/or other types of parameters.

In one illustrative example, controller 1046 is formed by first control unit 1048 and second control unit 1050. First control unit 1048 may be implemented within first robotic device 1024 and used to control operation of first robotic device 1024 and first end effector 1020.

Second control unit 1050 may be implemented within one of second robotic device 1026 and second end effector 1022. In some cases, a portion of second control unit 1050 may be implemented in second robotic device 1026, while another portion of second control unit 1050 may be implemented within second end effector 1022.

In this illustrative example, first robotic device 1024 and second robotic device 1026 may be programmed using numerical control data 1019 such that first end effector 1020 and second end effector 1022, respectively, may be moved down a centerline of path 1018. However, in other illustrative examples, numerical control data 1019 may be used to identify a modified path. This modified path may be offset from a centerline of path 1018 by some distance. This distance may be constant along path 1018 or may vary along path 1018, depending on the implementation. The modified path may then be used to guide first end effector 1020 and second end effector 1022 along surface 1004 of object 1002 instead of path 1018. The modified path may more accurately indicate the location of each of number of surface mismatches 1010.

The illustration of sanding environment 1000 in FIG. 10 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, number of surface features 1008 may include a number of edges of object 1002. These edges may be the outer edges of object 1002. In these examples, first end effector 1020 and/or second end effector 1022 may be used to change the shape of these edges. As one illustrative example, rotating flap brush 1034 may be used to smooth out the outer edges of object 1002. In this manner, rotating flap brush 1034 may be used to perform other operations in addition to dulling operation 1031.

The outer edges of object 1002 may be radiused to prepare surface 1004 of object 1002 for, for example, a shot peening process. A shot peening process involves impacting a surface with shot particles with sufficient force to cause plastic deformation of surface 1004 of object 1002. However, when the shot particles impact a sharp edge, such as the outer edge of an object, the force of the shot particles may cause an undesired inconsistency to form at the edge of the object.

Consequently, it may be desirable to use rotating flap brush 1034 to smooth out the edges of object 1002 prior to performing the shot peening process. This type of smoothing of the edges may be referred to as "edge breaking" or "edge radiusing." Numerical control data 1019 may be used to program first robotic device 1024 to move rotating flap brush 1034 along the edges of object 1002 to smooth out or round out these edges. In this manner, an edge of object 1002 may be radiused using first end effector 1020 based on numerical control data 1019 used to form object 1002.

With reference now to FIG. 11, an illustration of a process for sanding a number of surface features is depicted in the form of a flowchart in accordance with an illustrative embodiment. The process illustrated in FIG. 11 may be implemented in sanding environment 100 in FIG. 1.

The process may begin by performing a first type of operation on a number of surface features on a surface of an object using a first end effector (operation 1100). Feedback laser data may then be generated about the number of surface features after the first type of operation has been performed using a laser device (operation 1102).

A second type of operation may be performed on the number of surface features using a second end effector and the feedback laser data to rework the number of surface features until the number of surface features has been reworked to within selected tolerances (operation 1104), with the process terminating thereafter.

With reference now to FIG. 12, an illustration of a process for sanding a number of surface mismatches on a surface of wing skin is depicted in the form of a flowchart in accordance with an illustrative embodiment. The process illustrated in FIG. 12 may be implemented in sanding environment 100 in FIG. 1.

The process may begin by identifying a path over a surface of an object using numerical control data that was previously used to perform a number of operations on the surface of the object that created a number of surface features (operation 1200). A first end effector may be moved over the surface of the object along the path identified (operation 1202). A reflective finish of each of the number of surface features may be dulled using a dulling tool of the first end effector while moving the first end effector along the path (operation 1204).

A second end effector may be moved over the surface of the object along the path identified (operation 1206). Feedback laser data may be generated about the number of surface features using a laser device associated with the second end effector while moving the second end effector along the path identified (operation 1208). Each surface feature in the number of surface features may be sanded to within selected tolerances using a sanding tool of the second end effector and the feedback laser data generated by the laser device while moving the second end effector along the path identified (operation 1210), with the process then terminating thereafter.

With reference now to FIG. 13, an illustration of a process for performing a sanding operation on a surface mismatch is depicted in the form of a flowchart in accordance with an illustrative embodiment. The process illustrated in FIG. 13 may be implemented in sanding environment 100 in FIG. 1. This process may be used to implement operations 1208 and 1210 in FIG. 12.

The process begins by generating a mismatch measurement for a surface feature in a span-wise direction and in a chord-wise direction using a laser device (operation 1300). A determination may be made as to whether the mismatch measurement of the surface feature in either the span-wise direction or the chord-wise direction is within selected tolerances (operation 1302).

If the mismatch measurement of the surface feature is within selected tolerances in both the span-wise direction and the chord-wise direction, the process terminates. Otherwise, if the mismatch measurement of the surface feature in either the span-wise direction or the chord-wise direction is not within the selected tolerances, a sanding tool is used to sand the surface feature to within the selected tolerances (operation 1304), with the process then returning to operation 1300 as described above. In this manner, the surface feature that has been sanded may be reevaluated by generating another mismatch measurement for the surface feature.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in the form of a block diagram in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in the form of a block diagram in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412 and/or during maintenance and service 1414 in FIG. 14. The use of a number of the different illustrative embodiments may substantially expedite the assembly of and/or reduce the cost of aircraft 1500.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   identifying a path over a surface of an object using numerical control data that was used to create a number of surface features created by a number of operations performed on the surface of the object;
   performing a first type of operation on the number of surface features on the surface of the object using a first end effector by guiding the first end effector along the path;
   generating feedback laser data about the number of surface features after the first type of operation has been performed using a laser device; and
   performing a second type of operation on the number of surface features using a second end effector and the feedback laser data, by guiding the second end effector along the path to rework the number of surface features until the number of surface features has been reworked to within selected tolerances;
   wherein performing the first type of operation comprises dulling a reflective finish of a surface feature in the number of surface features using a dulling tool to allow the laser device to measure the surface feature and generate the feedback laser data.

2. The method of claim 1, wherein performing the second type of operation comprises:
   sanding the surface feature using a sanding tool and the feedback laser data until the surface feature has been sanded to within the selected tolerances.

3. The method of claim 1, wherein performing the first type of operation comprises:
   moving the first end effector over the surface of the object along the path identified; and
   dulling the reflective finish of each of the number of surface features using the dulling tool of the first end effector while moving the first end effector along the path.

4. The method of claim 1, wherein performing the second type of operation comprises:
   moving the second end effector over the surface of the object along the path identified; and
   sanding each surface feature in the number of surface features to within the selected tolerances using a sanding tool of the second end effector and the feedback laser data while moving the second end effector along the path.

5. The method of claim 1, wherein generating the feedback laser data comprises:

generating a mismatch measurement for a surface feature in the number of surface features in a span-wise direction and in a chord-wise direction using the laser device, wherein the surface feature is a surface mismatch.

6. The method of claim 5, wherein performing the second type of operation comprises:
determining whether the mismatch measurement for the surface feature in either the span-wise direction or the chord-wise direction is within selected tolerances; and
sanding the surface feature using a sanding tool of the second end effector in response to a determination that the mismatch measurement for the surface feature in either the span-wise direction or the chord-wise direction is not within the selected tolerances.

7. The method of claim 1 further comprising:
radiusing an edge of the object using the first end effector based on numerical control data used to form the object.

8. An apparatus comprising:
a controller configured to identify a path over a surface of an object using numerical control data that was used to create a number of surface features created by a number of operations performed on the surface of the object;
a first end effector configured to perform a first type of operation on the number of surface features on the surface of the object by guiding the first end effector along the path;
a laser device configured to generate feedback laser data about the number of surface features after the first type of operation has been performed; and
a second end effector configured to perform a second type of operation on the number of surface features using the feedback laser data by guiding the second end effector along the path to rework the number of surface features until the number of surface features has been reworked to within selected tolerances;
wherein the first end effector comprises a dulling tool configured to dull a reflective finish of a surface feature in the number of surface features to allow the laser device to measure the surface feature and generate the feedback laser data.

9. The apparatus of claim 8, wherein the dulling tool is a rotating flap brush.

10. The apparatus of claim 8, wherein the second end effector comprises:
a sanding tool configured to sand the surface feature using the feedback laser data until the surface feature has been sanded to within the selected tolerances.

11. The apparatus of claim 10, wherein the sanding tool is a sanding pad.

12. The apparatus of claim 8, wherein the controller is configured to control a first robotic device to move the first end effector over the surface of the object along the path identified.

13. The apparatus of claim 8, wherein the controller is configured to control a second robotic device to move the second end effector over the surface of the object along the path identified.

14. The apparatus of claim 8, wherein the second end effector comprises:

a control unit configured to receive the feedback laser data about a surface feature in the number of surface features from the laser device and identify a number of parameters for sanding the surface feature based on the feedback laser data; and
a sanding tool configured to sand the surface feature based on the number of parameters.

15. The apparatus of claim 8, wherein a surface feature in the number of surface features is a surface mismatch.

16. An automated sanding system comprising:
a controller configured to identify a path over a surface of an object using numerical control data that was previously used to create a number of surface features by a number of operations performed on the surface of the object;
a first end effector that includes a dulling tool configured for use in dulling a reflective finish of the number of surface features;
a first robotic device configured to move the first end effector along the path identified and position the dulling tool over each of the number of surface features;
a second end effector comprising:
a laser device configured to generate feedback laser data about the number of surface features after the reflective finish of the number of surface features has been dulled; and
a sanding tool configured for use in sanding the number of surface features based on the feedback laser data until the number of surface features has been sanded to within selected tolerances; and
a second robotic device configured to move the second end effector along the path identified and position the sanding tool and the laser device over the each of the number of surface features.

17. The method of claim 1, wherein the first type of operation is performed before the second type of operation, and wherein the first type of operation is different from the second type of operation.

18. The automated sanding system of claim 16, wherein generating the feedback laser data comprises:
generating a mismatch measurement for a surface feature in the number of surface features in a span-wise direction and in a chord-wise direction using the laser device, wherein the surface feature is a surface mismatch.

19. The automated sanding system of claim 18, further comprising:
determining whether the mismatch measurement for the surface feature in either the span-wise direction or the chord-wise direction is within selected tolerances; and
sanding the surface feature using the sanding tool of the second end effector in response to a determination that the mismatch measurement for the surface feature in either the span-wise direction or the chord-wise direction is not within the selected tolerances.

20. The automated sanding system of claim 16 further comprising:
radiusing an edge of the object using the first end effector based on numerical control data used to form the object.

* * * * *